United States Patent [19]
Anderson et al.

[11] 3,777,709
[45] Dec. 11, 1973

[54] REARING OF FISH

[75] Inventors: James Iain Walker Anderson, Milltimber; Donald Henry Albert Marr, by Fort William; Graham Chesterton Phillips, Stonehaven, all of Scotland

[73] Assignee: Lever Brothers Company, New York, N.Y.

[22] Filed: Jan. 19, 1972

[21] Appl. No.: 219,158

[30] Foreign Application Priority Data
Jan. 28, 1971 Great Britian.................3363/71

[52] U.S. Cl. .................................................. 119/3
[51] Int. Cl............................................ A01k 61/00
[58] Field of Search .......................................... 119/3

[56] References Cited
UNITED STATES PATENTS

| | | | |
|---|---|---|---|
| 3,446,185 | 5/1969 | Cavanagh | 119/3 |
| 3,406,662 | 10/1968 | Vik et al. | 119/3 |
| 3,495,572 | 2/1970 | Groves | 119/3 |
| 3,572,291 | 3/1971 | Cavanagh | 119/3 |

Primary Examiner—Hugh R. Chamblee
Attorney—Louis F. Kline, Jr. et al.

[57] ABSTRACT

A method of rearing fish, particularly anadromous fish of the family Salmonidae in a captive environment. More particularly, rearing the young fish in fresh water and feeding them to appetite until they reach, and maintain for about two weeks, a Condition Factor, K, of at least 0.8; transferring the young fish directly from fresh water to natural tidal sea water, without acclimatisation in water of intermediate salinity; and, rearing the fish on an artificially administered diet for at least three months.

9 Claims, No Drawings 3,777,709

REARING OF FISH

The invention relates to the rearing of fish particularly to those fish of the family Salmonidae that are anadromous that is to say, fish that are spawned in fresh water but later migrate to the sea, in which environment by far the greater part of their growth occurs.

For the purpose of the present description, the term "smolt" will be used for all anadromous salmonid fish which have matured in fresh water to a stage where they would, in their natural habitat, migrate to the sea for the first time. Furthermore, the term "fresh water" includes not only water of that low salinity (i.e. less than about 0.5 parts salt per 1,000) characteristic of water in which fish such as salmon naturally spawn, but also water of substantially higher salinity (i.e. up to 10 parts salt per 1,000) in which, by regular and adequate feeding, anadromous fish can be reared through the early stages of growth and development to the smolt stage. The term "sea water" means natural tidal sea water having a salinity of at least 20 parts salt per 1,000 and usually 30–35 parts salt per 1,000.

In their natural habitat, the young of these salmonid fish hatch in fresh water rivers or lakes and remain there until they reach the smolt stage, recognisable in most genera by a distinct change in apperance, usually of the skin. They then migrate downstream to the sea, whose salinity they encounter more or less gradually so that they have time — even if only a few hours — to become acclimatised to the change. After growing to maturity in the sea the fish then return to a fresh water river to spawn.

In their natural fresh water habitat, food is usually scarce and smolts do not feed to appetite while in local fresh water or while migrating towards the sea; hence, they are usually under-nourished and in poor condition and have a Condition Factor as low as 0.70.

It should be explained that the Condition Factor, K, is a well-known expression used by anglers and fish farmers to ascertain whether any round fish, including salmonids, are in "good" or "poor" condition, or, in other words, whether the fish are heavier or lighter than the average fish of a particular length. The Condition Factor is calculated from the expression $$K = (w \times 100)/l^3$$

where $w$ represents the weight of the fish in grams and $l$ its length in centimetres.

It has long been accepted that a fish in average condition has a K value equal to 1.00; if K is less than 1.00, the fish is considered to be in poor condition, since it weighs less than expected and is long and thin. If the fish is fat, its weight will be more than expected and K will be greater than 1.00; see for example Frost W E and Brown M E "The Trout" published by Collins, London in 1967, at page 82.

We have found that smolts in very poor condition, that is having a Condition Factor of less than 0.80, invariably die if transferred directly from fresh water to sea water, whereas they stand a fair chance of survival if acclimatised to the change in environment by gradually increasing the salinity over a period of hours or days, thus simulating the changes experienced during natural migration to the sea. The same observations have been noted by Jones J W in "The Salmon" published by Collins, London in 1959, who at page 38, states that "There is little doubt that these fish could not withstand a sudden transfer from fresh to salt water. ...If the change of medium took 10 hours or longer, the smolts survived."

Farming of trout and salmon has been conducted in North America and Northern Europe since before the turn of the century, but this has been mainly for the purpose of stocking fresh water rivers and lakes with smolts to provide sport for anglers. In the case of Atlantic salmon, there has been some small-scale activity in providing fish for food by rearing the young fish first to the smolt stage in fresh water and then later to maturity in land based sea water tanks or ponds. The transfer from fresh water to sea water has always been accomplished by gradual acclimatisation to the increase in salinity, thereby to simulate a condition which the wild smolt would encounter during its migration from fresh to sea water.

If salmonid fish are to be reared artificially, it can be seen from the foregoing that there are at present these problems to be faced:

1. that unless a high mortality is accepted, smolts cannot be transferred directly from fresh water to sea water, 2. that when smolts are ready to be transferred from fresh water to sea water, it is accordingly necessary to acclimatise them via water of intermediate salinity, thereby to simulate the gradual acclimatisation experienced by wild smolt during migration to the sea: this artificial acclimatisation procedure is unduly costly as it involves maintenance of acclimatisation tanks or ponds supplied at a controlled rate with both fresh and sea water, and 3. that the maintenance of land based sea water tanks or ponds involving the pumping of sea water is also a costly procedure in view of the well-known corrosive effect of sea water on the pumping equipment and the need to keep the tanks and ponds regularly cleaned.

With these problems in mind, it seems not to have occurred to anyone that direct transfer of smolts from fresh water to natural tidal sea water, without the risk of high mortality, might be practicable under certain circumstances.

We have, however, surprisingly and unexpectedly found that the inordinate and unacceptable mortality resulting from direct transfer referred to by Jones and confirmed by our own experiments can be avoided provided that certain preconditions are observed. In particular, we have discovered that if the fish are reared to a Condition Factor of at least 0.80 prior to direct transfer, and are kept at or above that Condition Factor until transfer is carried out, then mortality as a result of transfer can be materially reduced or even eliminated completely.

According to the invention, we provide a method of rearing anadromous fish of the family Salmonidae in which smolts are transferred from fresh water to natural tidal sea water without allowing acclimatisation in water of intermediate salinity, the smolts before said transfer having been reared artificially in fresh water under conditions such that at least two weeks prior to transferring them they attain a Condition Factor of at least 0.8; the smolts after transfer being reared on an artificially administered diet for at least three months.

Preferably the smolts should be reared to a Condition Factor of from 0.9 to 1.2 at transfer.

The smolts can attain a Condition Factor of at least 0.8 by regular feeding to appetite (that is, by providing sufficient feed to satisfy their appetite) on a high nutrition diet. (Such a diet is not, of course, available in their local fresh water habitat nor during their migration to the sea.) The composition of such a diet is not critical and several diets we have tested appear equally suited to rearing the fish to a size and weight which satisfy the minimum Condition Factor. For example, minced mammalian liver or the proprietary salmon feed known as "EWOS Salmon Feed" (based on a high proportion of protein with added fat, carbohydrate, minerals and vitamins) may be employed to feed young salmonids from the time first feeding starts to the smolt stage.

It is preferred that the minimum Condition Factor should be achieved as early in the life cycle as possible, and this may be several months before the contemplated direct transfer. It is however necessary that the minimum Condition Factor must have been reached at least two weeks before transfer.

The smolts should be fed to appetite for the greater part of these two weeks. It is preferable, but not essential, that feeding should cease about 1-2 days before transfer.

The sea water to which the smolts are transferred is natural tidal sea water, contained for example by floating covered cages, which are just off-shore, below low tide. Alternatively, regions of sea lochs or fjords having a barrier to prevent escape of the fish provide an environment in which the smolts can develop, after transfer, into adult fish.

After the smolts have been transferred to natural tidal sea water, they are fed regularly until ready for harvesting and sale. Feeding after transfer will continue in sea water for at least three months and usually for 18 months to 2 years, after which time the fish may have increased their individual weight from about 30 g as a smolt, when first transferred, to about 3 kg as a fully grown fish.

For post-smolt feeding in sea water, a feed of chopped fresh fish or mammalian liver is very suitable, but alternative feeds may be used if desired. The fish are conveniently fed to appetite, for example at the rate of about 3 g per 30 g fish to 150 g per 3 kg fish per day.

Apart from the obvious economic advantages of using natural tidal sea water which avoids the high installation, running and maintenance costs of land based tanks or ponds and their associated sea water pumping equipment, we have found that the fish reared in natural tidal sea water can show a higher growth rate and a better food conversion ratio than fish reared after direct transfer to land based tanks supplied with sea water. These features of the invention are illustrated in Example 1.

Examples of fish which can be reared according to the invention are species of the genus Salmo, such as *Salmo salar* (the Atlantic salmon), *S. gairdnerii* (steel head), and *S. trutta* (sea trout), and species of the genus Oncorhynchus, such as *O. tschawytscha* (Chinook salmon), *O. kisutch* (Coho salmon) and *O. nerka nerka* (sockeye salmon).

The invention is further illustrated by the following Examples, which relate to *Salmo salar* (Atlantic salmon). The stages of the life cycle of this fish, covering the period up to and including smolting which would normally be followed by migration to sea water are:

Alevins

Young salmon which hatch at about the end of March from eggs which were fertilised the previous November/December. Alevins have yolk sacs attached to the undersurface of their bodies; the yoke sac acts as a source of nourishment for the first two months of life.

Fingerlings

Young salmon, about 2.5 cm in length, which, having lost their yolk sacs, commence feeding (known as "first feeding"). They grow in size and are then known as parr.

Parr

Young salmon of from 2–20 g in weight with 10–12 fingerprint-like areas of pigmentation (parr marks) along the middle of each side of the body.

Silver Parr

Young salmon of from 11–50 g in weight with sufficient guanine deposition in the epidermis to produce a shiny, silvery appearance on the body flanks but not sufficient to completely obscure the parr marks.

Smolts

Young salmon generally of 11–60 g in weight with sufficient deposition of guanine in the epidermis to produce a shiny, silvery appearance from the ventral surface up to the dorso-lateral region of the body totally obscuring the parr marks; the fish have matured in fresh water to a state where they would, in their natural habitat, migrate to the sea for the first time.

EXAMPLE 1

This Example compares the use of a land based sea water tank and a wire mesh cage floating in natural tidal sea water in the direct transfer of salmon smolts.

Materials and Methods 887 salmon smolts were selected for the experiment from a mixed population of smolts and parr. The fish in the mixed population were the survivors of a group of 1,000 fish which had been graded in March of the second year of the experiment as large parr, with an average weight of 9.06 g, from several populations of parr which hatched in March of the first year of the experiment from Shin river salmon eggs. From May to September of that first year, the fish in these populations had been fed on minced ox liver with an occasional supplement of mineral mix. However, from September, these populations were weaned at intervals from liver to Ewos dry salmon food. All populations were successfully weaned on to dry salmon food by December of the first year of the experiment and were maintained on dry food thereafter. The Condition Factor of these fish varied from 0.80 to 1.08 with an average value of 0.91.

From March of the second year of the experiment, the 1,000 large parr were maintained in a tank having a surface area of 3.8 square metres which was supplied with fresh river water at a rate of 70–80 litres per minute. They were fed daily up to the middle of June of the second year of the experiment on Ewos dry salmon food.

Examination of a sample of fish at the beginning of June of the second year showed that parr marks were still visible on the majority of the fish but a subsequent examination two weeks later showed that most of the fish had reached the smolt stage of development.

The smolts were then separated from the remaining parr, weighed individually, and transferred to two other 3.8 square metre tanks supplied with fresh water. 847 smolts were transferred to one of the 3.8 square metre tanks but the other tank received only 40 smolts, the 78 parr being left in the riginal 3.8 square metre tank.

One day after the smolts were separated from the parr, the 847 smolts were netted out of the first 3.8 square metre tank and transferred to an hexagonal cage which enclosed about 33 cubic metres of natural tidal sea water.

The remaining 40 smolts were netted from the second fresh water tank, transferred to a third 3.8 square metre tank which was filled to a depth of 33 centimetres, and supplied with pumped high salinity sea water at a rate of 80 litres per minute. To reduce the possibility of disturbance of these smolts, two thirds of the top of the tank was subsequently covered with wooden boards placed across opposite thirds of the tank.

After release, both populations were fed to appetite on about 6 occasions each day with minced fish and ox liver pellets. On each occasion, feeding was continued until the pellets were ignored by the majority of the smolts. Feeding of the smolts released into the sea cage commenced in the afternoon immediately after their release but feeding of the smolts released into the land based 3.8 square metre tank did not commence until the morning of the following day. The smolts released into the cage floating in natural tidal sea water were starved for 2.5 days before release into high salinity sea water but the smolts released into the land based tank were starved for 2.75 days before and for 0.75 days after release into high salinity sea water.

Both populations of smolts were maintained in their respective facilities for 95 days after the commencement of feeding.

At the end of this 95 day period, the number and total weight of the fish remaining in each population was recorded. Mortalities in both facilities were removed and recorded, and salinity, temperature and water flow were recorded at intervals.

Results

1. Transfer

All the smolts were alive when released into the sea cage and the land based tank.

2. Physical Data

The temperature of the fresh water when the smolts were removed for transfer to the sea cage was 19.1°C, and 20°C when the smolts were removed for transfer to the land based sea water tank. The temperature and salinity of the sea water supplied to this tank on the day of release of the smolts was 14.3°C and 32.0 parts per 1,000 respectively. Subsequent determinations showed that the salinity of the sea water did not fall below 30.0 parts per 1,000.

The water velocity and the rate of change of the volume of sea water in the cage in the natural tidal sea water varied with tidal flow and wind direction and speed. At around mid-tide flood and in the absence of wind, the water velocity at the surface was approximately 14.4 cm per second and it was calculated that the rate of change of the water in the cage was about once every 40 seconds.

In the land based 3.8 square metre tank supplied with pumped sea water, the submerged inflow was situated at the periphery of the tank and the water moved over a spiral to the central drain and in consequence the velocity of flow increased towards the centre of the tank. With an inflow of 80 litres per minute, the flow velocity at the periphery of the tank was about 20 cm per second and the rate of change of water volume in the tank about once every 16 minutes.

3. Behaviour

The behaviour of the fish released into the 3.8 square metre tank showed positive rheotropism and maintenance of station against the current in mid-water. However, since the tank was shaded on two opposite sides, the population of fish split up into two groups, one in each shaded area. The behaviour of the fish released into the sea cage was quite different. There was no obvious orientation to the water flow through the cage even at mid-tide flood when the water velocity was maximum and the fish swam in circles round the cage in a shoal which, although well dispersed across the cage in the horizontal place, rarely occupied more than half the depth of the cage.

The smolts in both the land based tank and the cage in the natural tidal sea water commenced feeding soon after release into the high salinity environment. However, the fact that the smolts released into the land based tank split up into two groups on opposite sides of the tank resulted in much more wastage of food since it was difficult to get small enough quantities of food close enough to the groups of fish. In consequence, some of the food supplied to the tank was unavailable to the fish and was in fact swept to the central drain before it was intercepted by a fish. Wastage of food in the 3.8 square metre tank was aggravated by the fact that the relatively low numbers of fish in the tank and their tendency to maintain station resulted in a relatively large proportion of tank being devoid of fish. Although fish in the 3.8 square metre tank occasionally picked up pellets which were being displaced by the current across the floor of the tank, most of the pellets ingested by the fish were taken as they were carried in mid-water by the current or as they hit the surface of the water. It was much easier to prevent excessive wastage of food in the cage in the natural tidal sea water, since the 2.25 metres depth of water in the cage meant that food was available to the fish as it sank down through the cage for a much longer period of time than was the case in the 3.8 square metre tank where the depth of water was just over 33 centimetres. Moreover, since the fish were distributed across almost the whole of the cage in the horizontal plane, it was almost impossible to throw food into areas of the cage which were devoid of fish. In addition, since the top of the cage was open, it was generally much easier to see when the majority of the fish had stopped taking food than was the case in the land based 3.8 square metre tank. Nevertheless, some wastage of food was inevitable when the method of feeding employed was to supply food until it was ignored by the majority of the fish in either the tank or the cage, but at the time of the experiment this was the only method of feeding which ensured that attainment of the maximum growth potential was not prevented by an inadequate supply of food.

4. Mortalities

Although 40 fish were released into the land based tank supplied with pumped sea water, two smolts jumped out shortly after release before the covers could be correctly aligned and one fish, which was observed to have abrasion to the flanks in the region of the pelvis fins, was removed. Only one of the 37 fish retained in the tank died during the 95 day period of the experiment after transfer and there were not unaccountable losses, so that the percentage mortality was calculated as 2.70.

During the 95 day period of the experiment after transfer, recorded mortalities amounted to 13 or 1.54 percent of the 847 fish which were released into the cage in the natural tidal sea water. It was concluded that the percentage loss in the fish released into the natural tidal sea water cage did not differ significantly from that in the fish released into the land based tank.

5. Growth

At the start of the experiment, the average weight of the 37 fish retained in the land based sea water tank was 35.5 g and the total weight of the population was 1,313 g. At the end of the 95 day experiment, the average weight of the 36 surviving fish was 271.2 g and the total weight of the live population was 9,764 g. Thus the total weight increment of the live fish during the experiment was 8,486 g or 664 percent.

At the start of the experiment, the average weight of the 847 fish released into the cage in the natural tidal sea water was 32.1 g and the total weight of the population was 27.176 kg. At the end of the 95 day experiment, the total weight of the population, after subtracting the weight of the 13 dead fish, was 256.3 kg, so that the average weight of the 834 survivors was 307.5 g. Thus the total weight increment during the experiment was 229.5 kg or 858 percent.

It was concluded that the growth of the smolts which had been released into the cage which enclosed an area of high salinity natural tidal sea water was better than that of the smolts which had been released into a land based tank supplied with pumped high salinity sea water.

6. Stocking Density

At the time of release, the 37 smolts which were retained in the and based 3.8 square metre tank had a total weight of 1.313 g and the volume of enclosed sea water was 1.26 cubic metres so that the initial stocking density was just in excess of 1 kg per cubic metre. Similarly, the final stocking density in the tank was just below 8 kg per cubic metre while the initial and final stocking densities in the cage in the natural tidal sea water were 0.8 and 7.5 kg per cubic metre respectively.

7. Food Conversion Ratio

During the 95 day period of the experiment, the smolts which were retained in the land based tank were supplied with 28.93 kg of minced fish and ox liver pellets and increased in weight by 8.486 kg. Thus the crude food conversion ratio in this population was 3.41:1. The population of smolts which were retained in the cage in the natural tidal sea water was supplied with 334.0 kg of feed pellets and increased in weight by 229.5 kg, so that the crude food conversion ratio in this population was 1.44:1. It was concluded that the crude food conversion ratio in the fish which were released into and retained in the cage in the natural tidal sea water was much better than that in the fish retained in the land based tank supplied with pumped sea water.

DISCUSSION AND CONCLUSIONS

The results detailed above show conclusively that although survival and growth of fish which were released into high salinity sea water in both a land based tank and in natural tidal sea water enclosed by a cage are extremely good, the growth of the population released into the natural tidal sea water enclosed by a cage is far superior to that of the population released into the land based tank.

The most probable reason for the superior growth of the population released into an area of natural tidal sea water enclosed by a cage is that the living space available to this population is much greater than is the living space available to the population released into sea water in the land based tank. The cage enclosed 33 cubic metres of sea water whilst the land based tank contained only 1.26 cubic metres of sea water. The depth of sea water available to the fish enclosed in the sea cage was 2.25 metres whilst the depth available to the fish in the land based tank was just in excess of 0.33 metres. Under natural conditions, the living space available to a smolt that has left a fresh water river and moved to the sea is, in relation to the size of the fish, almost infinite.

Other factors which could be important are possible differences in locomotor activity due to differences in the velocity of the water flow in the cage and in the land based tank, the differences in the average rate of change of the volume of water in the cage and tank and the small differences in the period of starvation experienced by the two populations during the period around release into high salinity sea water.

The probability is, however, that of these factors, only the difference in the period of starvation is important, for although the smolts in the land based tank swam at a fast enough rate to enable them to maintain station against the current, the fish in the sea cage swam in circles round the cage at a relatively high cruising rate. The difference in the rate of change of the volume of water containing the fish was unlikely to have had any effect in this experiment because the lower rate of change in the land based tank was sufficient to remove the waste products of metabolism and to maintain the dissolved oxygen level well above the critical level.

The population of smolts released in the land based tank were starved for 2.75 days before and 0.75 days after release, whereas the population of smolts released into the area of natural tidal sea water enclosed by the hexagonal cage were starved for only 2.5 days before release. Hence it is possible that this small difference in the period of starvation may have had some effect on the result obtained.

The fact that salmon smolts can be transferred from their fresh water rearing tanks and released into an enclosed area of high salinity natural tidal sea water without adverse effect on either survival or growth, has a great effect on the economics of salmon farming, since it completely removes the need to pump and distribute sea water to land based tanks. This greatly reduces both the capital and the revenue costs of installing and operating a commercial salmon farm.

EXAMPLE 2

This Example compares (a) the direct transfer of salmon smolt with (b) transfer with gradual acclimatisation in both cases using tanks to facilitate control and measurement of salinity.

Materials and Methods

Alevins hatched during March of the first year of the experiment from Shin river salmon eggs commenced feeding some two months later. For the next six months, the alevins were fed on a diet of mammalian liver in large hatchery tanks supplied with natural river water and thereafter they were maintained on EWOS feed in tanks having a surface area of 3.8 square metres and supplied with river water at a rate of from 40 – 60 litres per minute.

12 months after feeding had commenced (i.e. in May of the second year of the experiment), 137 smolting silver parr having an average Condition Factor which exceeded 0.8, were transferred to a separate 3.8 square metre tank supplied at a rate of 60 litres per minute with fresh water having a salinity of less than 1 part salt per 1,000, and they were fed daily on EWOS feed for the next 16 days. The feed was then withheld for 24 hours and the fish were netted out of the fresh water tank, transferred to a tub containing 20 litres fresh water, netted individually from the tub, weighed and then visually examined. The fish were then put alternatively into one or other of two further tubs containing fresh water until one tub contained 69 smolting silver parr and the other contained 68.

The tubs were then emptied separately into two 3.8 square metre tanks, one containing fresh water and the other sea water. The first tank was then supplied with fresh water and sea water at rates which, by the end of the same day, produced a salinity of 4 parts salt per 1,000 with a total inflow of 68 litres per minute. The proportion of sea water to fresh water inflow was thereafter increased each day so that the salinity of the water in the tank rose by 5 parts salt per 1,000 daily until it reached a value of 34 parts salt per 1,000 6 days after transfer, the entire inflow of the tank then being sea water. That tank which had contained sea water from the start was replenished with it at a uniform rate of 68 litres per minute.

The two populations of 69 and 68 smolts were maintained in the two tanks for 39 days and then were weighed individually.

The salinities and temperatures of the water in the two tanks were measured daily, and are shown in abbreviated form in Table I.

TABLE 1

| Days after transfer | Acclimatisation Tank Salinity parts per 1000 | Temp. °C | Sea Water Tank Salinity parts per 1000 | Temp. °C |
|---|---|---|---|---|
| 0 | 1.0 | 13 | | |
| 0 | 4.0 | 13 | 33.8 | 11 |
| 1 | 10.8 | 12 | 33.7 | 11 |
| 2 | 15.4 | 12 | 33.8 | 11 |
| 3 | 21.8 | 12 | 33.6 | 11 |
| 4 | 25.8 | 12 | 33.7 | 11 |
| 5 | 31.4 | 11 | 33.9 | 11 |
| 39 | 31.5 | 14 | 31.5 | 14 |

The smolts in both tanks were fed to appetite six times a day with chopped fish and minced liver. Feeding was confined to daylight hours during these latter 39 days of the experiment.

RESULTS

1. Mortality

There were no deaths in either the population of smolts which were gradually being acclimatised to sea water or the population which was taken from fresh water and put direct into sea water.

EXAMPLE 3

The procedure described in Example 2 with respect to direct transfer to sea water was repeated using salmon smolts which had been starved for several weeks before the planned transfer. These smolts had an average Condition Factor of 0.72 at the time they were transferred to a land based tank containing natural sea water. Although the tank was supplied with a fresh supply of pumped sea water, 80 percent of the fish died within 3 days after transfer to the tank.

EXAMPLE 4

The procedure of Example 2 was repeated except that salmon smolts were transferred directly to a sea cage floating in natural tidal sea water. Again, no deaths in either the population of smolts which had been gradually acclimatised to sea water or the population which had been taken from fresh water and put directly into natural tidal sea water were recorded.

EXAMPLE 5

This Example illustrates the effect of starvation on salmon smolts (*Salmo salar*) immediately prior to direct transfer from fresh water to floating cages located off-shore in natural tidal sea water. All smolts had a K value of greater than 0.8.

Three separate experiments were set up to examine the effect of excessive starvation immediately prior to direct transfer.

In the first experiment, a group of smolts were starved for 5 of the 7 days immediately prior to the day on which they were released directly into a sea water cage. A mortality of 14 percent occurred within 7 days after transfer had taken place.

In the second experiment, a similar group of smolts were starved for 6 of the 7 days immediately prior to direct transfer to a sea water cage. A mortality of 18 percent was recorded within 7 days after transfer had taken place.

In the third experiment, a similar group of smolts were fed normally up to 48 hours immediately before transfer: no further feed was given after this period. No deaths were observed as a result of direct transfer to sea water.

It would appear from these experiments that, although a short period of starvation immediately before transfer apparently does no harm and may in fact improve the chances of completely successful direct transfer, it is desirable that normal feeding should be continued for at least 4 days of the 7 which immediately precede transfer.

What is claimed is:

1. A method of rearing anadromous fish of the family Salmonidae which comprises the steps of:

i. rearing young salmonid fish in fresh water, having a salinity of less than 0.5 parts salt per 1,000, after hatching by feeding them regularly to appetite on an artificially administered diet so that they attain a Condition Factor of at least 0.8, said Condition Factor, K, being defined by the expression $$K = (w \times 100)/l^3$$

where $w$ is the weight of the fish in grams and $l$ its length in centimetres, ii. transferring the yound salomid fish after they have reached the smolt stage from said fresh water to natural tidal sea water, having a salinity of 30 to 35 parts salt per 1,000, without allowing acclimatisation in water of intermediate salinity, the smolt stage being that stage in their development where they would in their natural habitat migrate to the sea for the first time, and the Condition Factor of at least 0.8 having been attained at least two weeks prior to transferring them, and iii. rearing the smolts after transfer to said natural tidal sea water on an artificially administered diet for at least three months.

2. A method of rearing anadromous fish of the family Salmonidae which comprises the steps of:

i. rearing young salmonid fish in fresh water, having a salinity of less than 0.5 parts salt per 1,000, after hatching by feeding them regularly to appetite on an artificially administered diet so that they attain a Condition Factor of from 0.9 to 1.2, said Condition Factor, K, being defined by the expression $$K = w \times 100/l^3$$

where $w$ is the weight of the fish in grams and $l$ its length in centimetres, ii. transferring the young salomid fish after they have reached the smolt stage from said fresh water to natural tidal sea water, having a salinity of 30 to 35 parts salt per 1,000, without allowing acclimatisation in water of intermediate salinity, the smolt stage being that stage in their development where they would in their natural habitat migrate to the sea for the first time, and the Condition Factor of from 0.9 to 1.2 having been attained at least two weeks prior to transferring them, and iii. rearing the smolts after transfer to said natural tidal sea water on an artificially administered diet for at least three months.

3. A method of rearing anadromous fish of the family Salmonidae which comprises the steps of:

i. rearing young salmonid fish in fresh water, having a salinity of less than 0.5 parts salt per 1,000, after hatching by feeding them regularly to appetite on an artificially administered diet so that they attain a Condition Factor of from 0.9 to 1.2, said Condition Factor, K, being defined by the expression $$K = w \times 100/l^3$$

where $w$ is the weight of the fish in grams and $l$ its length in centimetres, ii. starving the young salmonid fish for from 1 to 2 days after they have reached the smolt stage, the smolt stage being that stage in their development where they would in their natural habitat migrate to the sea for the first time, and the Condition Factor of from 0.9 to 1.2 having been attained at least two weeks prior to the period of starvation, iii. transferring the young salmonid fish from said fresh water to natural tidal sea water, having a salinity of 30 to 35 parts salt per 1,000, without allowing acclimatisation in water of intermediate salinity, the transfer being performed immediately after said period of starvation, and iv. rearing the smolts after transfer to said natural tidal sea water on an artificially administered diet for at least three months.

4. A method of rearing anadromous fish of the family Salmonidae which comprises the steps of:

i. rearing young salmonid fish in fresh water, having a salinity of less than 0.5 parts salt per 1,000, after hatching by feeding them regularly to appetite on an artificially administered diet so that they attain a Condition Factor of from 0.9 to 1.2 and an average weight of at least 30 grams, said Condition Factor, K, being defined by the expression $$K = w \times 100/l^3$$

where $w$ is the weight of the fish in grams and $l$ its length in centimetres, ii. transferring the young salmonid fish after they have reached the smolt stage from said fresh water to natural tidal sea water having a salinity of 30 to 35 parts salt per 1,000 without allowing climatisation in water of intermediate salinity the smolt stage being that stage in their development where they would in their natural habitat migrate to the sea for the first time and the Condition Factor of from 0.9 to 1.2 and the average weight of at least 30 grams having been attained at least two weeks prior to transferring them, and iii. rearing the smolts after transfer to said natural tidal sea water on an artificially administered diet for at least three months.

5. A method of rearing anadromous fish of the family Salmonidae which comprises the steps of:

i. rearing young salmonid fish in fresh water, having a salinity of less than 0.5 parts salt per 1,000, after hatching by feeding them regularly to appetite on an artificially administered diet so that they attain a Condition Factor of from 0.9 to 1.2 and an average weight of at least 30 grams, said Condition Factor, K, being defined by the expression $$K = w \times 100/l^3$$

where $w$ is the weight of the fish in grams and $l$ its length in centimetres, ii. starving the young salmonid fish for from 1 to 2 days after they have reached the smolt stage, the smolt stage being that stage in their development where they would in their natural habitat migrate to the sea for the first time, and the Condition Factor of 0.9 to 1.2 and the average weight of at least 30 grams having been attained at least two weeks prior to the period of starvation, iii. transferring the young salmonid fish from said fresh water to natural tidal sea water having a salinity of 30 to 35 parts salt per 1,000 without allowing acclimatisation in water of an intermediate salinity the transfer being conducted immediately after said period of starvation, and iv. rearing the smolts after transfer to said natural tidal sea water on an artificially administed diet for at least three months.

6. A method according to claim 5, wherein the smolts belong to the genus Salmo.

7. A method according to claim 5, wherein the smolts are Salmo salar.

8. A method according to claim 5, wherein the smolts belong to the genus Oncorhynchus.

9. A method of rearing *Salmo salar* (Atlantic Salmon) which comprises the steps of:

i. rearing young fish of the species *Salmo salar* in fresh water after hatching as alevins through the fingerling and parr stages by feeding them regularly to appetite on an artificially administered diet so that the parr attain a Condition Factor of at least 0.8, said Condition Factor, K, being defined by the expression $$K = w \times 100/l^3$$

where $w$ is the weight of the fish in grams and $l$ its length in centimetres, the fresh water having a salinity of less than 10 parts salt per 1,000, ii. further rearing the parr in said fresh water by regular feeding to appetite until they smolt, iii. transferring the smolts from said fresh water to natural tidal sea water having a salinity of from 20 – 35 parts salt per 1,000 without first allowing the smolts to acclimatise in water of intermediate salinity, the Condition Factor of 0.8 having been attained at least two weeks prior to transferring them and the smolts being fed to appetite on an artificially administered diet for the greater part of said two weeks, and iv. rearing the smolts after transfer to the natural tidal sea water on an artificially administered diet for at least three months.

* * * * *